US00RE39523E

(19) United States
(12) Reissued Patent
Fujii

(10) Patent Number: US RE39,523 E
(45) Date of Reissued Patent: Mar. 20, 2007

(54) POWER CONTROL APPARATUS FOR A BATTERY-POWERED COMMUNICATION SYSTEM

(75) Inventor: Tatsuya Fujii, Kanagawa (JP)

(73) Assignee: Ricoh Company, Ltd. (JP)

(21) Appl. No.: 10/283,116

(22) Filed: Oct. 30, 2002

Related U.S. Patent Documents

Reissue of:
(64) Patent No.: 6,140,714
Issued: Oct. 31, 2000
Appl. No.: 09/263,499
Filed: Mar. 8, 1999

(30) Foreign Application Priority Data

Mar. 17, 1998 (JP) ..... 10-067305

(51) Int. Cl.
*H02J 1/00* (2006.01)

(52) U.S. Cl. ..... 307/31; 307/38
(58) Field of Classification Search ..... 307/10.1, 307/31, 38; 327/112
See application file for complete search history.

(56) References Cited

U.S. PATENT DOCUMENTS 5,272,382 A * 12/1993 Heald et al. ..... 307/66
5,550,489 A * 8/1996 Raab ..... 326/93
5,744,874 A * 4/1998 Yoshida et al. ..... 307/10.1
5,806,006 A * 9/1998 Dinkins ..... 455/574
5,898,232 A * 4/1999 Reents et al. ..... 307/18
6,084,444 A * 7/2000 Menezes ..... 327/112

FOREIGN PATENT DOCUMENTS

JP 5-88790 * 4/1993
JP 5-265597 * 10/1993
JP 6-139373 * 5/1994

* cited by examiner

*Primary Examiner*—Robert L. DeBeradinis
(74) *Attorney, Agent, or Firm*—Dickstein Shapiro LLP

(57) ABSTRACT

A power control apparatus includes a first driven circuit and a second driven circuit connected to the first driven circuit. A primary power-supply circuit produces a primary voltage from a source voltage of a battery and supplies the primary voltage to drive the first driven circuit. A secondary power-supply circuit produces a secondary voltage from the source voltage of the battery or from the primary voltage of the primary power-supply circuit, and supplies the secondary voltage to drive the second driven circuit. A control circuit outputs a power-supply control signal to the secondary power-supply circuit in response to a command signal, so that the supply of the secondary voltage to the second driven circuit by the secondary power-supply circuit is started or terminated by the power-supply control signal.

16 Claims, 6 Drawing Sheets

POWER CONTROL APPARATUS FOR A BATTERY-POWERED COMMUNICATION SYSTEM

Matter enclosed in heavy brackets [ ] appears in the original patent but forms no part of this reissue specification; matter printed in italics indicates the additions made by reissue.

BACKGROUND OF THE INVENTION (1) Field of the Invention

The present invention relates to a power control apparatus which is suitable for use in a battery-powered system, such as a cellular mobile telephone or a portable electronic device.

(2) Description of the Related Art

A power control apparatus provided in a battery-powered system, such as a cellular mobile telephone or a portable electronic device, is known. In the power control apparatus, a source voltage of a battery is converted into a controlled voltage, and the controlled voltage is supplied to each of driven circuits (or functional elements) of the system. There is a demand for the power control apparatus of this type to reduce a power consumption of the driven circuits. In recent years, the power control apparatus of this type has been improved for the purpose of reducing a power consumption of the driven circuits.

For example, Japanese Laid-Open Patent Application No. 5-088790 discloses a power control system which is adapted to allow a sleep-mode operation of a CPU (central processing unit) in which the operation of the CPU is assured and the power of the CPU is turned OFF.

Japanese Laid-Open Patent Application No. 5-265597 discloses a micro-controller which allows a driven circuit to operate at a low voltage in a selected mode. In the micro-controller, a source voltage supplied to the driven circuit is controlled so as to meet one of power consumption reduction, operating speed increase and noise reduction modes.

Japanese Laid-Open Patent Application No. 6-139373 discloses a semiconductor device provided with a switch selectable between a normal power mode and a power saving mode. In the semiconductor device, a voltage supplied to a driven circuit is controlled by setting the switch to select one of the two modes.

FIG. 7 shows a conventional power control apparatus. The conventional power control apparatus of FIG. 7 includes a power-supply circuit 61 which supplies a source voltage of a first battery 60a through a diode 80 to a driven circuit 71. A power-supply circuit 62 supplies the source voltage of the first battery 60a to each of a driven circuit 72 and a power-supply circuit 63. The power-supply circuit 63 supplies a lower voltage, derived from the source voltage of the first battery 60a or from the power-supply circuit 62, to a driven circuit 73. A source voltage of a second battery 60b is supplied through a diode 81 to the driven circuit 71.

In the conventional power control apparatus of FIG. 7, the second battery 60b and the diode 81 constitute a backup power supply that acts to supply the source voltage of the second battery 60b to the driven circuit 71 when the source voltage of the first battery 60a supplied to the driven circuit 71 by the power-supply circuit 61 is discontinued. The power-supply circuit 63 acts as a dependent circuit that operates in dependence on a power-supply operation of the power-supply circuit 62. That is, the dependent power-supply circuit 63 operates to supply the lower voltage to the driven circuit 73 when the power-supply circuit 62 is operating. The dependent power-supply circuit 63 may include a DC-DC converter or a voltage regulator.

The relationship between the power-supply circuit 62 and the dependent power-supply circuit 63 is needed when the conventional power control apparatus includes functional blocks indicated by a dotted line in FIG. 7. That is, the relationship between the power-supply circuit 62 and the dependent power-supply circuit 63 is needed when one of the functional blocks (for example, the driven circuit 72) is driven by the power-supply circuit 72 at the source voltage of the battery 60a while the other functional block (for example, the driven circuit 73) is driven by the power-supply circuit 63 at the lower voltage derived from the source voltage.

In the conventional power control apparatus of FIG. 7, each of the driven circuits 71, 72 and 73 is provided with an oscillation circuit. When the oscillation circuit generates a clock signal with a lowered frequency and supplies the clock signal to the driven circuit of concern, the driven circuit is set in a low-speed mode so that it operates at a low speed. When the oscillation circuit stops supplying the clock signal, the driven circuit of concern is set in a stand-by mode. By using the oscillation circuits of the driven circuits 71, 72 and 73, the conventional power control apparatus of FIG. 7 acts to reduce the power consumption of the driven circuits 71, 72 and 73.

In the convectional power control apparatus of FIG. 7, if the source voltage is continuously supplied to the driven circuit of concern during the stand-by mode, it is difficult to completely prevent the flow of a leak current from a MOS (metal oxide semiconductor) transistor of the driven circuit. In order to eliminate this problem, it is necessary for the power-supply circuits 61 and 62 to stop the supplying of the source voltage of the first battery 60a to the driven circuits 71 and 72 when the driven circuit is in the stand-by mode.

However, in the conventional power control apparatus of FIG. 7, the power-supply circuit 63 continues to supply the lower voltage to the driven circuit 73 during the operation of the power-supply circuit 62. Even when the operation of the driven circuit 73 is not needed, the power-supply circuit 63 continuously supplies the lower voltage to the driven circuit 73. In such a condition, the driven circuit 73 unnecessarily consumes the power supplied by the power-supply circuit 63, and the conventional power control apparatus of FIG. 7 does not act to reduce the power consumption of the driven circuit 73.

SUMMARY OF THE INVENTION

An object of the present invention is to provide an improved power control apparatus in which the above-described problems are eliminated.

Another object of the present invention is to provide a power control apparatus which is effective in reducing a power consumption of a driven circuit by suitably controlling a power-supply operation of a secondary power-supply circuit which supplies power to the driven circuit in dependence on a power-supply operation of a primary power-supply circuit.

The above-mentioned objects of the present invention are achieved by a power control apparatus including: a first driven circuit; a second driven circuit which is connected to the first driven circuit; a primary power-supply circuit which produces a primary voltage from a source voltage of a battery and supplies the primary voltage to drive the first driven circuit; a secondary power-supply circuit which produces a secondary voltage from the source voltage of the battery or from the primary voltage of the primary power-supply circuit and supplies the secondary voltage to drive the second driven circuit; and a control circuit which outputs a power-supply control signal to the secondary power-supply circuit in response to a command signal, so that the supply of the secondary voltage to the second driven circuit by the secondary power-supply circuit is started or terminated by the power-supply control signal.

The above-mentioned objects of the present invention are achieved by a power control apparatus including: a first driven circuit; a second driven circuit which is connected to the first driven circuit; a primary power-supply circuit which is connected to a battery, the primary power-supply circuit producing a primary voltage from a source voltage of the battery and supplying the primary voltage to drive the first driven circuit; a secondary power-supply circuit which is connected to the primary power-supply circuit, the secondary power-supply circuit producing a secondary voltage from the source voltage of the battery or from the primary voltage of the primary power-supply circuit and supplying the secondary voltage to drive the second driven circuit; a primary oscillation part which outputs a clock signal to the first driven circuit; a primary reset generating part which outputs a primary reset signal to the first driven circuit when an oscillation of the primary oscillation part is detected to be stable, the primary reset signal causing the first driven circuit to start operation in accordance with the clock signal output by the primary oscillation part; a control signal generating part, connected to both the first driven circuit and the secondary power-supply circuit, which outputs a power-supply control signal to the secondary power-supply circuit in response to a command signal output by the first driven circuit, so that the supply of the secondary voltage to the second driven circuit by the secondary power-supply circuit is started or terminated by the power-supply control signal; a secondary oscillation part which outputs a clock signal to the second driven circuit; and a secondary reset generating part which outputs a secondary reset signal to the second driven circuit when an oscillation of the secondary oscillation part is detected to be stable, the secondary reset signal causing the second driven circuit to start operation in accordance with the clock signal output by the secondary oscillation part.

The power control apparatus according to the present invention is effective in reducing the power consumption of the second driven circuit in contrast to the conventional power control apparatus. In a preferred embodiment of the power control apparatus of the present invention, the power-supply operation of the secondary power-supply circuit is suitably controlled such that the supply of the secondary voltage to the second driven circuit is enabled by a high-state power-supply control signal only when it is needed, and the supply of the secondary voltage to the second driven circuit is disabled by a low-state power-supply control signal when it is unneeded. In a preferred embodiment of the power control apparatus of the present invention, the oscillation of the secondary oscillation part is quickly stabilized after a start command signal is output to the control signal generating part by the first driven circuit, and it is possible to achieve a speedy power-supply operation of the first and second driven circuits. Further, a preferred embodiment of the power control apparatus of the present invention acts to prevent the flow of a leak current from the first driven circuit into the second driven circuit when the supply of the secondary voltage to the second driven circuit is stopped, and it is possible to more effectively reduce the power consumption of the driven circuits.

BRIEF DESCRIPTION OF THE DRAWINGS

Other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1:
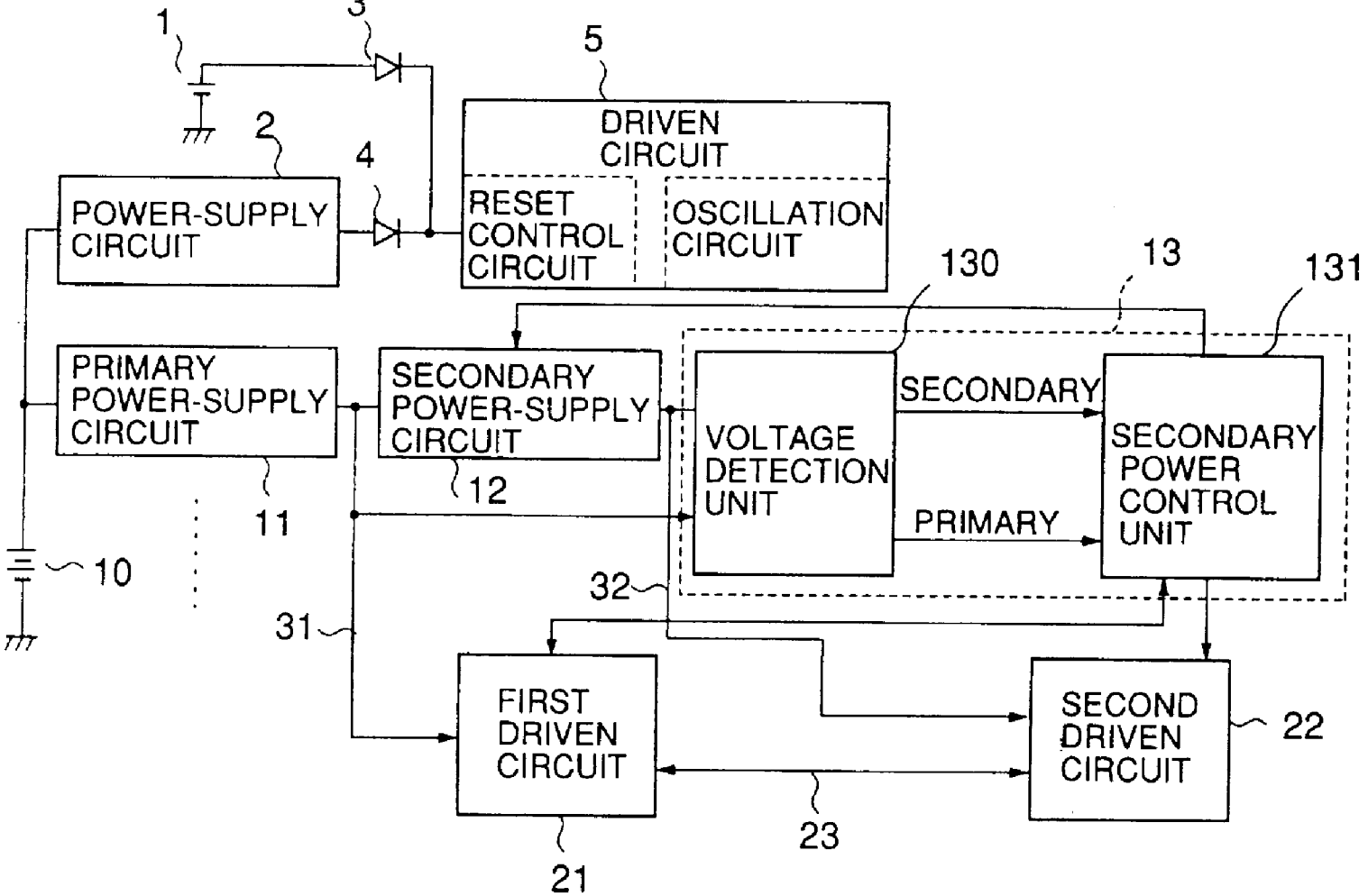
FIG. 1 is a block diagram of a power control apparatus embodying the present invention.

FIG. 1 shows an embodiment of a power control apparatus of the present invention.

As shown in FIG. 1, the power control apparatus in the present embodiment includes a power-supply circuit 2 which supplies a source voltage of a battery 10 through a diode 4 to a driven circuit 5. A source voltage of a battery 1 is supplied through a diode 3 to the driven circuit 5. The battery 1 and the diode 3 constitute a backup power supply that acts to supply the source voltage of the battery 1 to the driven circuit 5 when the source voltage of the battery 10 supplied to the driven circuit 5 by the power-supply circuit 2 is discontinued.

Figure 7:
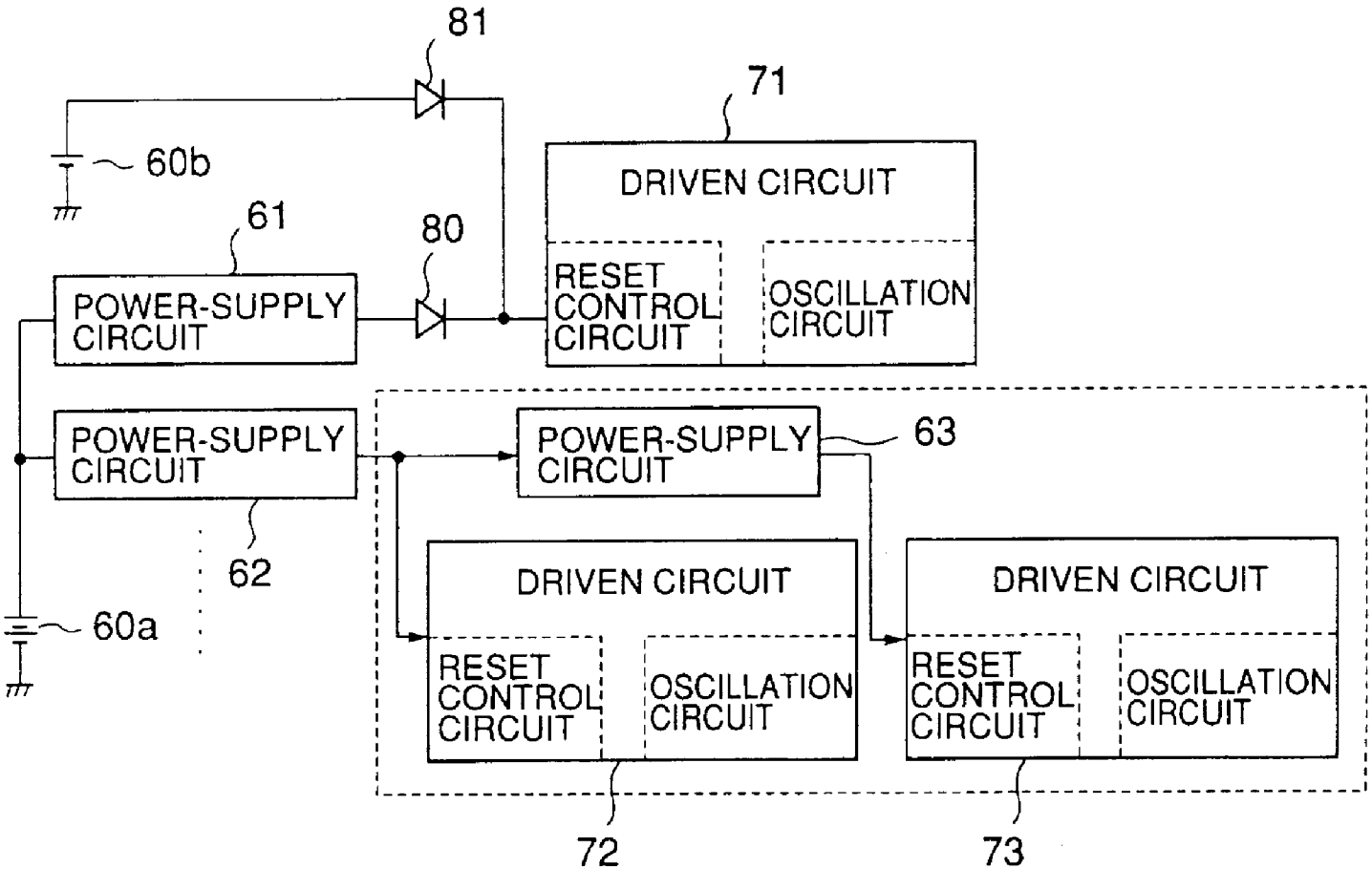
FIG.7 PRIOR ART
FIG. 7 is a block diagram of a conventional power control apparatus.

The elements 1, 2, 3, 4 and 5 of the power control apparatus, shown in FIG. 1, are essentially the same as the elements 60a, 61, 81, 80 and 71 of the conventional power control apparatus of FIG. 7, respectively, and a description thereof will be omitted for the sake of simplicity of description.

In the power control apparatus of FIG. 1, a primary power-supply circuit 11 has an input connected to the battery 10. The battery 10 is, for example, a 5-V battery. A secondary power-supply circuit 12 has an input connected to an output of the primary power-supply circuit 11. The primary power-supply circuit 11 produces a primary voltage (for example, 3 V) from the source voltage of the battery 10, and supplies the primary voltage through a power-supply line 31 to a first driven circuit 21. The secondary power-supply circuit 12 produces a secondary voltage (for example, 2 V) from the source voltage of the battery 10 or from the primary voltage of the primary power-supply circuit 11, and supplies the secondary voltage through a power-supply line 32 to a second driven circuit 22.

The secondary power-supply circuit 12 acts as a dependent circuit that operates in dependence on a power-supply operation of the primary power-supply circuit 11. That is, the dependent power-supply circuit 12 operates to supply the secondary voltage to the second driven circuit 22 when the first power-supply circuit 11 is operating.

The first driven circuit 21 and the second driven circuit 12 are interconnected by a dial line 23. A data signal output by the first driven circuit 21 is received by the second driven circuit 22 through the data line 23, and the second driven circuit 22 processes the received data. A data signal, indicating the processed data, output by the second driven circuit 22 is received by the first driven circuit 21, and the first driven circuit 21 further processes the received data.

The first driven circuit 21 and the second driven circuit 22 do not necessarily start operation at the same time. The first driven circuit 21 may solely start operation when the second driven circuit 22 stops operation. The second driven circuit 22 may not solely start operation when the first driven circuit 21 stops operation. The second driven circuit 22 starts operation only when the first driven circuit 21 is operating.

In the power control apparatus of FIG. 1, a control circuit 13 which includes a voltage detection unit 130 and a secondary power control unit 131 is provided.

Figure 2:
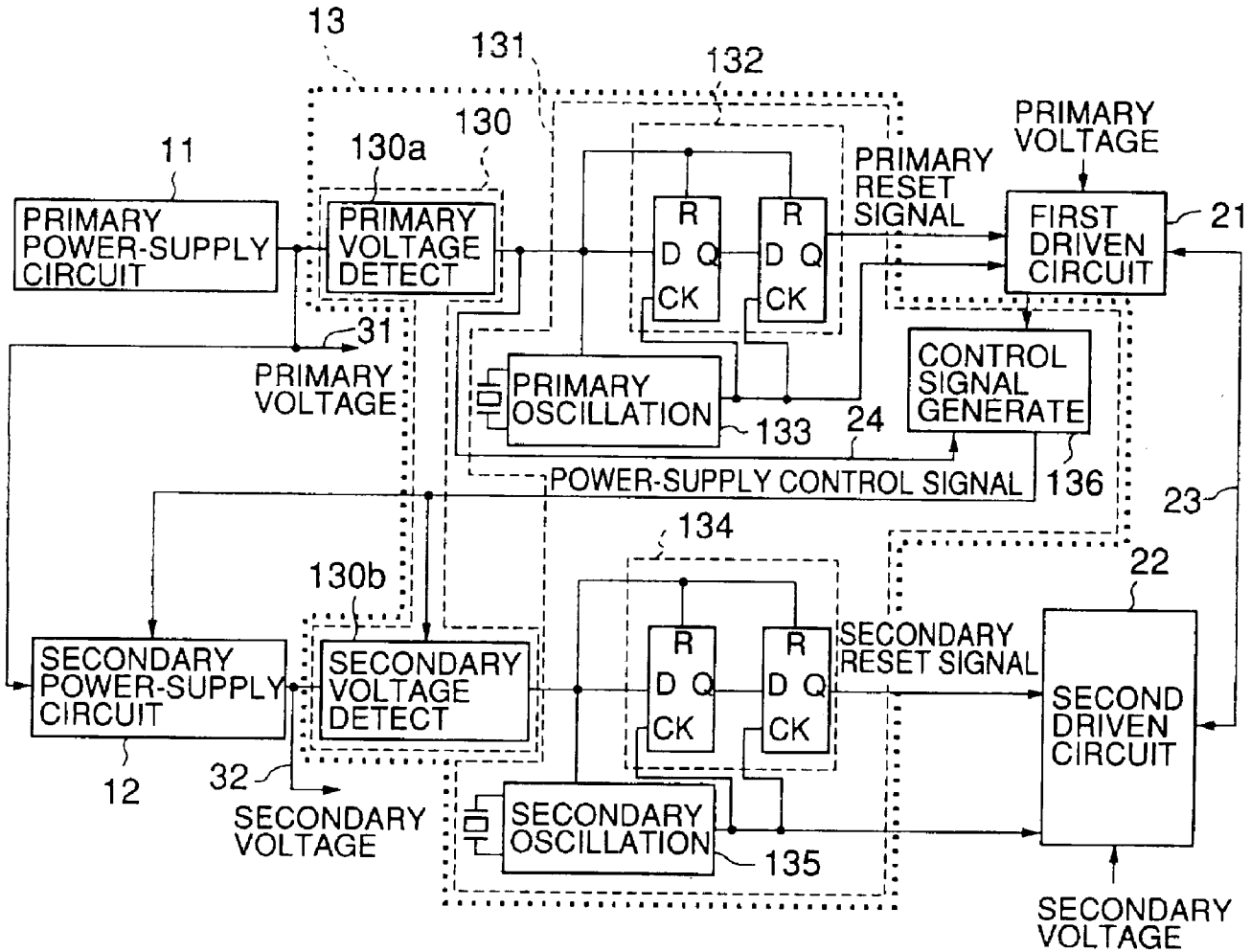
FIG. 2 is a circuit diagram of a control circuit of the power control apparatus of FIG. 1.
Figure 3:
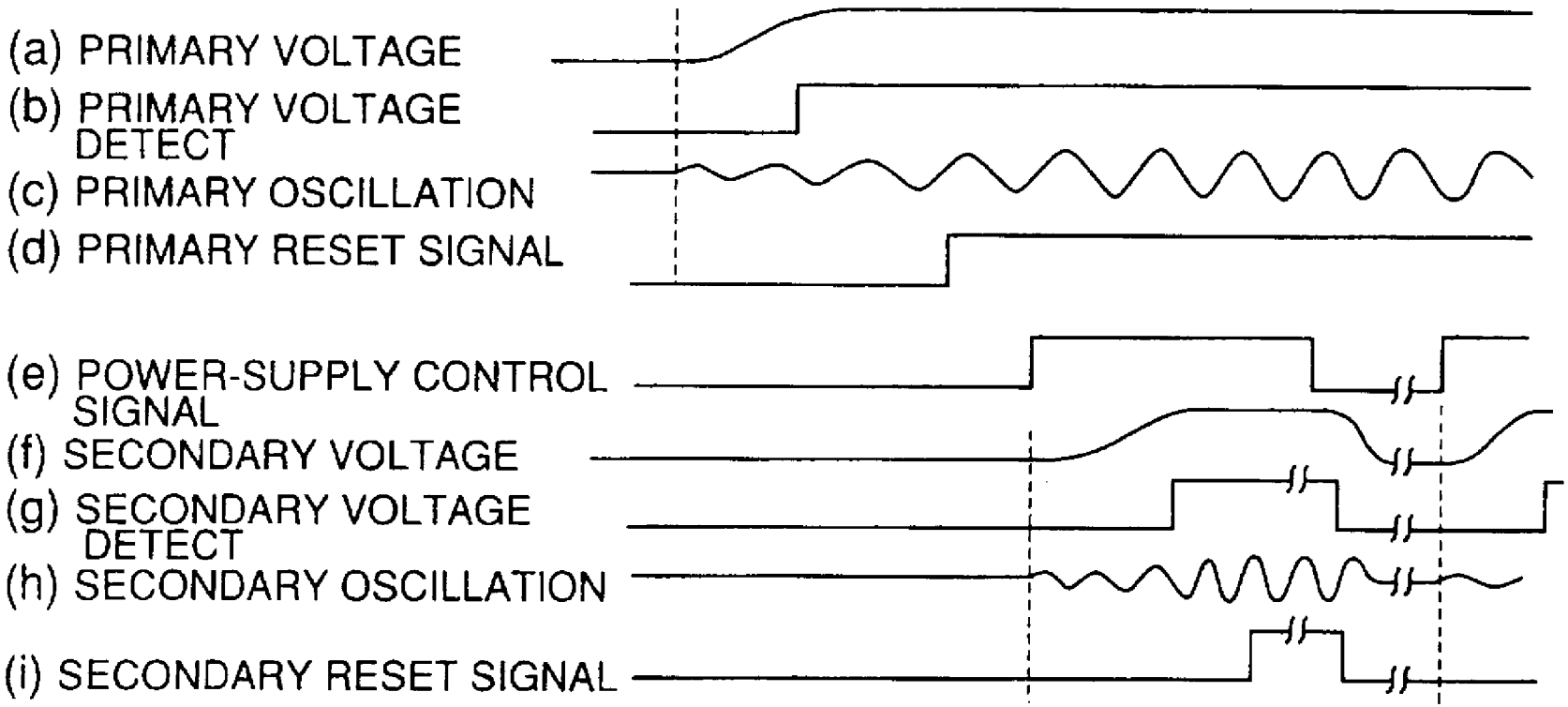
FIG. 3 is a time chart for explaining operations of the control circuit of the power control apparatus of FIG. 2.

FIG. 2 shows a configuration of the control circuit 13 of the power control apparatus of FIG. 1. FIG. 3 is a time chart for explaining operations of the control circuit of FIG. 2. The control circuit 13, including the voltage detection unit 130 and the secondary power control unit 131, is indicated by a dotted line in FIG. 2.

A description will be given of the configuration and operations of the control circuit of the power control apparatus in the present embodiment with reference to FIG. 2 and FIG. 3.

As indicated by (a) in FIG. 3, after a delay of a given period from a start of operation of the primary power-supply circuit 11, the primary power-supply circuit 11 is set in an operating condition that it can supply the primary voltage (for example, 3 V) to the first driven circuit 21.

The voltage detection unit 130 includes a primary voltage detection part 130a and a secondary voltage detection part 130b as shown in FIG. 2. As indicated by (b) in FIG. 3, the primary voltage detection part 130a detects the primary voltage supplied by the primary power-supply circuit 11 when the primary power-supply circuit 11 is set in the operating codition, and outputs a high-state signal to the secondary power control unit 131 of the control circuit 13.

The secondary power control unit 131 includes a primary oscillation part 133 as shown in FIG. 2. As indicated by (c) in FIG. 3, the primary oscillation part 133 starts oscillation at the same time as the start of operation of the primary power-supply circuit 11. After a delay of a given period, a clock signal (CK) produced by the oscillation of the primary oscillation part 133 becomes stable.

The secondary power control unit 131 includes a primary reset generating part 132, and the primary reset generating part 132 is constructed by two flip-flop circuits which are connected in a manner shown in FIG. 2. As indicated by (d) in FIG. 3, after a delay of a given period since the time the high-state signal is output by the primary voltage detection part 130a, the primary reset generating part 132 outputs a high-state signal (or a primary reset signal) to the first driven circuit 21.

When the primary reset signal output by the primary reset generating part 132 is received, the first driven circuit 21 starts operation. At the start of operation, the stable clock signal (CK) output by the primary oscillation part 133 is supplied to the first driven circuit 21, and the primary voltage output by the primary power-supply circuit 11 is supplied to the first driven circuit 21 through the power-supply line 31. The primary oscillation part 133 and the primary reset generating part 132 are driven by the power supplied from the primary power-supply circuit 11.

The secondary power control unit 131 includes a control signal generating part 136 as shown in FIG. 2. When transmitting the processed data from the first driven circuit 21 to the second driven circuit 22 via the data line 23, the first driven circuit 21 sends a start command signal to the control signal generating part 136. The start command signal causes the control signal generating part 136 to output a power-supply control signal (or a high-state signal) to the secondary power-supply circuit 12. As the secondary power-supply circuit 12 starts supplying the secondary voltage to the second driven circuit 12 in response to the high-state power-supply control signal, the second driven circuit 22 quickly starts operation by the power supplied from the secondary power-supply circuit 12.

As indicated by (e) in FIG. 3, when the start command signal output by the first driven circuit 21 is received, the control signal generating part 136 outputs the power-supply control signal (or the high-state signal) to each of the secondary power-supply circuit 12 and the secondary voltage detection part 130b.

On the other hand, when receiving the processed data from the second driven circuit 22 at the first driven circuit 21 via the data line 23, the first driven circuit 21 sends an end command signal to the control signal generating part 136. The end command signal causes the control signal generating part 136 to output a low-state power-supply control signal to the secondary power-supply circuit 12. As the secondary power-supply circuit 12 stops supplying the secondary voltage to the second driven circuit 22 in response to the low-state power-supply control signal, the second driven circuit 22 quickly terminates the power-supply operation after the processed data from the second driven circuit 22 is supplied to the first driven circuit 21.

As indicated by (e) in FIG. 3, when the end command signal output by the first driven circuit 21 is received, the control signal generating part 136 outputs the low-state power-supply control signal to each of the secondary power-supply circuit 12 and the secondary voltage detection part 130b.

In the control circuit 13 of FIG. 2, the detection signal output by the primary voltage detection part 130a is supplied through a signal line 24 to the control signal generating part 136. Even when the start command signal output by the first driven circuit 21 is received, the control signal generating part 136 acts to delay the start of operation of the secondary power-supply circuit 12 until a high-state detection signal output by the primary voltage detection part 130a is received. When a low-state detection signal output by the primary voltage detection part 130a is received, the control signal generating part 136 acts to stop the operation of the secondary power-supply circuit 12.

The secondary voltage detection part 130b starts operation when the high-state power-supply control signal output by the control signal generating part 136 is received. Also, the secondary power-supply circuit 12 starts operation when the high-state power-supply control signal is received. As indicated by (f) in FIG. 3, after a delay of a given period from the start of operation, the secondary power-supply circuit 12 is set in a operating condition that it can supply the secondary voltage (for example, 2 V) to the second driven circuit 22.

The secondary power control unit 131 includes a secondary reset generating part 134 and a secondary oscillation part 135 as shown in FIG. 2. As indicated by (g) in FIG. 3, the secondary voltage detection part 130b detects the secondary voltage supplied by the secondary power-supply circuit 12 when the secondary power-supply circuit 12 is set in the operating condition, and outputs a high-state signal to each of the secondary reset generating part 134 and the secondary oscillator part 135 of the secondary power control unit 131.

As indicated by (h) in FIG. 3, the secondary oscillation part 135 starts oscillation at the same time as the start of operation of the secondary power-supply circuit 12. After a delay of a given period, a clock signal (CK) produced by the oscillation of the secondary oscillation part 135 becomes stable.

The secondary reset generating part 134 of the secondary power control unit 131 is constructed by two flip-flop circuits which are connected in a manner shown in FIG. 2. As indicated by (i) in FIG. 3, after a delay of a given period since the time the high-state signal is output by the secondary voltage detection part 130b, the secondary reset generating part 134 outputs a high-stage signal (or a secondary reset signal) to the second driven circuit 22.

When the secondary reset signal output by the secondary reset generating part 134 is received, the second driven circuit 22 starts operation. At the start of operation, the stable clock signal (CK) output by the secondary oscillation part 135 is supplied to the second driven circuit 22, and the secondary voltage output by the secondary power-supply circuit 12 is supplied to the second driven circuit 22 through the power-supply line 32. The secondary oscillation part 135 and the secondary reset generating part 134 are driven by the power supplied from the secondary power-supply circuit 12.

As previously described, in the conventional power control apparatus of FIG. 7, even when the operation of the driven circuit 73 is not needed, the power-supply circuit 63 continuously supplies the lower voltage to the driven circuit 73. In such a condition, the driven circuit 73 unnecessarily consumes the power supplied by the power-supply circuit 63.

Figure 4:
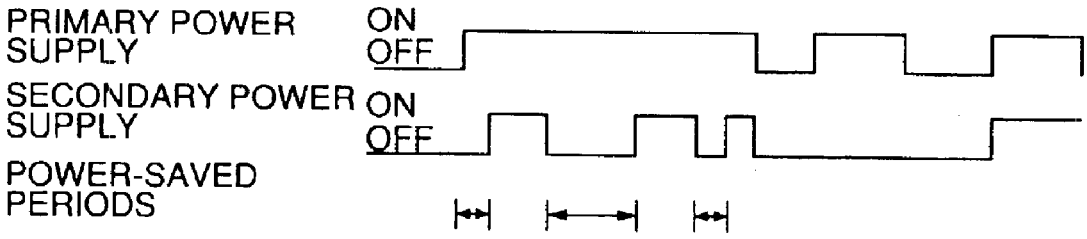
FIG. 4 is a time chart for explaining power-saved periods during an operation of the power control apparatus of FIG. 1.

FIG. 4 shows power-saved periods during an operation of the power control apparatus of FIG. 1.

In contrast to the conventional power control apparatus of FIG. 7, the above-described embodiment of the power control apparatus is effective in reducing the power consumption of the second driven circuit 22. As shown in FIG. 4, the power-supply operation of the secondary power-supply circuit 12 is suitably controlled such that the supply of the secondary voltage to the second driven circuit 22 is enabled by the high-state power-supply control signal only when it is needed, and the supply of the secondary voltage to the second driven circuit 22 is disabled by the low-state power-supply control signal when it is unneeded.

In order to achieve a speedy power-supply operation of the first and second driven circuits 21 and 22, it is necessary that the oscillation of the secondary oscillation part 135 becomes stable as quickly as possible after the start command signal is output to the control signal generating part 136 by the first driven circuit 21.

Figure 5:
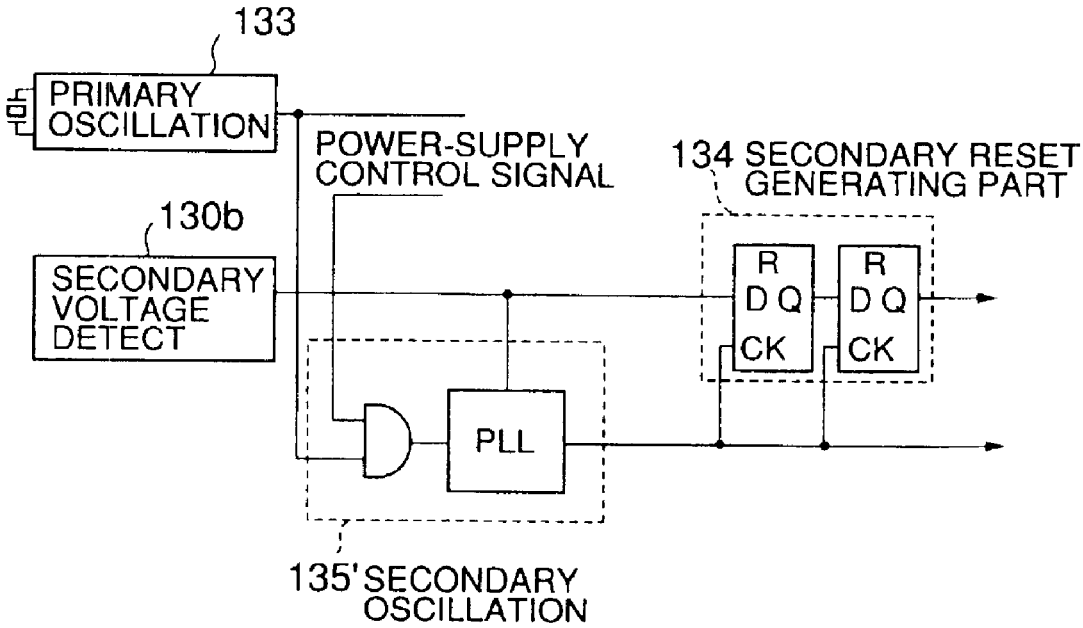
FIG. 5 is a circuit diagram of a modification of a secondary oscillation circuit in the control circuit of FIG. 2.

FIG. 5 shows a modification of the secondary oscillation part 135 in the control circuit of FIG. 2. A secondary oscillation circuit 135' shown in FIG. 5 is provided in order to achieve a speedy power-supply operation of the first and second driven circuits 21 and 22. In FIG. 5, the elements which are essentially the same as corresponding elements in FIG. 2 are designated by the same reference numerals, and a description thereof will be omitted.

The secondary oscillation circuit 135' of FIG. 5 is constructed by a two-input AND gate and a PLL (phase-locked loop) circuit which are connected in a manner shown in FIG. 5. The AND gate has an input connected to an output of the control signal generating part 136, and an input connected to an output of the primary oscillation part 133. The AND gate has an output connected to an input of the PLL circuit. The PLL circuit has another input connected to an output of the secondary voltage detection part 130b. In response to a high-state clock signal output by the AND gate, the PLL circuit quickly produces a stable clock signal with a locked frequency, and supplies it to the second driven circuit 22.

In the secondary oscillation circuit 135' of FIG. 5, when the power-supply control signal at the output of the control signal generating part 136 is held in a high state, the AND gate passing the clock signal, supplied by the primary oscillation part 133, to the PLL circuit. When a high-state clock signal output by the AND gate is received, the PLL circuit quickly produces a stable clock signal with the locked frequency, and supplies it to the second driven circuit 22. Hence, it is possible to achieve a speedy power-supply operation of the first and second driven circuits 21 and 22.

Further, in order to more effectively reduce the power consumption of the driven circuits, it is desirable to prevent the flow of a leak current from the first driven circuit 21 into the second driven circuit 22 when the supply of the secondary voltage to the second driven circuit 22 is stopped. When there is a difference in a drive voltage between the first driven circuit 21 and the second driven circuit 22, it is necessary to eliminate the voltage difference.

Figure 6A:
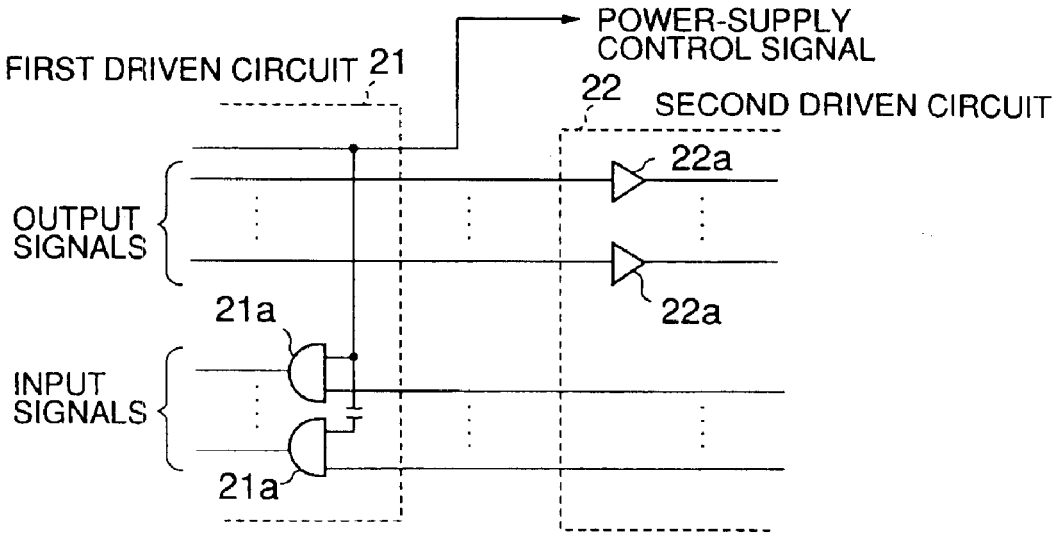
FIG. 6A and FIG. 6B are circuit diagrams of a modification of first and second driven circuits in the power control apparatus of FIG. 1.
Figure 6B:
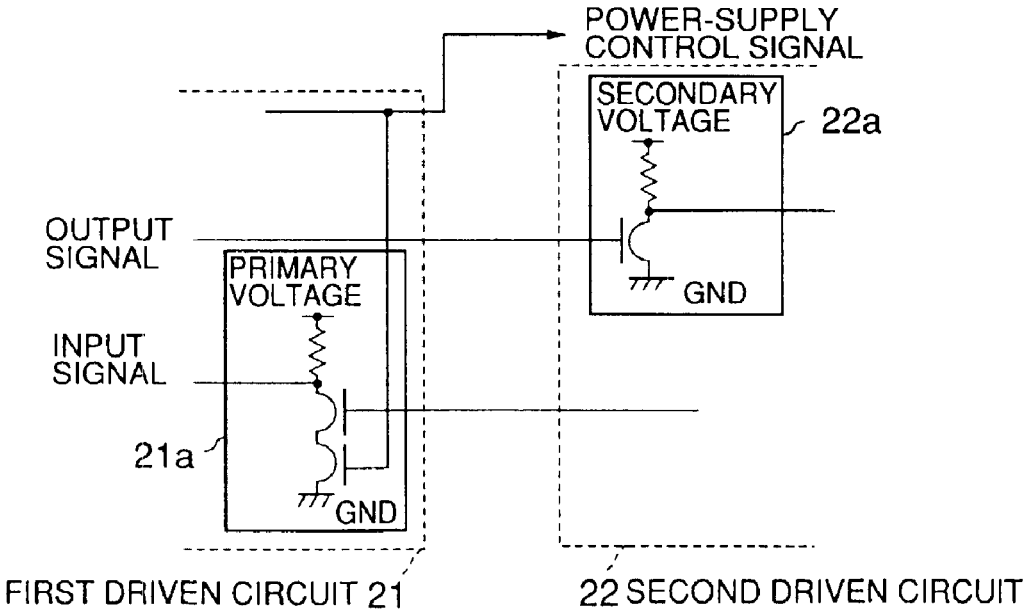

FIG. 6A and FIG. 6B show a modification of the first and second driven circuits 21 and 22 in the power control apparatus of FIG. 1.

In FIG. 6A, the first driven circuit 21 has inputs at which two-input AND gates 21a are provided, and the second driven circuit 22 has inputs at which buffer gates 22a are provided. Data signals output by the second drive circuit 22 are supplied to the AND gates 21a at the inputs of the first driven circuit 21, and data signals output by the first driven circuit 21 are supplied to the buffer gates 22a at the inputs of the second driven circuit 22. In FIG. 6B, an example of the configuration of the respective inputs of the first and second driven circuits 21 and 22 is shown, in which one of the two-input AND gates 21a and one of the buffer gates 22a, shown in FIG. 6A, are constructed by MOS transistors and resistors which are connected in series as shown in FIG. 6B.

The first and second driven circuits 21 and 22 shown in FIG. 6A and FIG. 6B are provided to prevent the flow of a leak current from the first driven circuit 21 in the second driven circuit 22 when the supply of the secondary voltage to the second driven circuit 22 is stopped.

As shown in FIG. 6A, at the inputs of the first driven circuit 21, the two-input AND gates 21a are provided. Each AND gate 21a is constructed by a resistor and two MOS transistors. The resistor and the two MOS transistors are connected in series between a primary voltage line and a grounded base in a manner shown in FIG. 6B. Each AND gate 21a has an input (or a gate of one of the MOS transistors) connected to a signal line from the second driven circuit 22, and has an input (or a gate of the other MOS transistor) connected to an output (the power-supply control signal) of the control signal generating part 136.

When the power-supply control signal at the output of the control signal generating part 136 is held in a high state, the AND gate 21a sets the first driven circuit 21 in an operating condition that it can receive a data signal supplied by the second driven circuit 22 via the signal line. When the data signal that is set in a high state by the second driven circuit 22 is received, the AND gate 21a of the first driven circuit 21 converts the received data into a high-state data signal based on the primary voltage.

As shown in FIG. 6A, at the inputs of the second driven circuit 22, the buffer gates 22a are provided. Each buffer gate 22a is constructed by a resistor and a MOS transistor. The resistor and the MOS transistor are connected in series between a secondary voltage line and a grounded base in a manner shown in FIG. 6B. Each buffer gate 22a has an input (or a gate of the MOS transistor) connected to a signal line from the first driven circuit 21, and has an output connected to an internal element (not shown) of the second driven circuit 22. When the data signal that is set in a high state by the first driven circuit 21 is received from the signal line, the buffer gate 22a of the second driven circuit 22 converts the received data into a high-state data signal based on the secondary voltage.

In the above-described embodiment of the power control apparatus in which the first and second driven circuits 21 and 22 of FIG. 6A and FIG. 6B are provided, it is possible to prevent the flow of a leak current from the MOS transistor of the first driven circuit 21 into the second driven circuit 22 when the supply of the secondary voltage to the second driven circuit 22 is stopped. Hence, it is possible to more effectively reduce the power consumption of the first and second driven circuits 21 and 22.

Further, the present invention is not limited to the above-described embodiments, and variations and modifications may be made without departing from the scope of the present invention.

The present invention is based on Japanese priority application No. 10-067305, filed on Mar. 17, 1998, the entire contents of which are hereby incorporated by reference.

What is claimed is:

1. A power control apparatus comprising:

a first driven circuit;

a second driven circuit connected to the first driven circuit;

a primary power-supply circuit for producing a primary voltage from a source voltage of a battery and supplying the primary voltage to drive the first driven circuit;

a secondary power-supply circuit for producing a secondary voltage from the source voltage of the battery or from the primary voltage of the primary power-supply circuit, and for supplying the secondary voltage to drive the second driven circuit; and control means for outputting a power-supply control signal to the secondary power-supply circuit in response to a command signal *from the first driven circuit*, so that the supply of the secondary voltage to the second driven circuit by the secondary power-supply circuit is started or terminated by the power-supply control signal.

2. The apparatus according to claim 1, wherein the control means outputs a high-state power-supply control signal to the secondary power-supply circuit in response to a start command signal output by the first driven circuit, the high-state power-supply control signal causing the secondary power-supply circuit to start the supply of the secondary voltage to the second driven circuit.

3. The apparatus according to claim 1, wherein the control means outputs a low-state power-supply control signal to the secondary power-supply circuit in response to an end command signal output by the first driven circuit, the low-state power-supply control signal causing the secondary power-supply circuit to terminate the supply of the secondary voltage to the second driven circuit.

4. A power control apparatus comprising:

a first driven circuit;

a second driven circuit connected to the first driven circuit;

a primary power-supply circuit connected to a battery, the primary power-supply circuit producing a primary voltage from a source voltage of the battery and supplying the primary voltage to drive the first driven circuit;

a secondary power-supply circuit connected to the primary power-supply circuit, the secondary power-supply circuit producing a secondary voltage from the source voltage of the battery or from the primary voltage of the primary power-supply circuit and supplying the secondary voltage to drive the second driven circuit;

a primary oscillation part for outputting a clock signal to the first driven circuit;

a primary reset generating part for outputting a primary reset signal to the first driven circuit when an oscillation of the primary oscillation part is detected to be stable, the primary reset signal causing the first driven circuit to start operation in accordance with the clock signal output by the primary oscillation part;

a control signal generating part, connected to both the first driven circuit and the secondary power-supply circuit, for outputting a power-supply control signal to the secondary power-supply circuit in response to a command signal output by the first driven circuit, so that the supply of the secondary voltage to the second driven circuit by the secondary power-supply circuit is started or terminated by the power-supply control signal;

a secondary oscillation part for outputting a clock signal to the second driven circuit; and a secondary reset generating part for outputting a secondary reset signal to the second driven circuit when an oscillation of the secondary oscillation part is detected to be stable, the secondary reset signal causing the second driven circuit to start operation in accordance with the clock signal output by the secondary oscillation part.

5. The apparatus according to claim 4, wherein the secondary oscillation part includes a gate circuit and a phase-locked loop PLL circuit, the gate circuit having a first input connected to an output of the control signal generating part, a second input connected to an output of the primary oscillation part, and an output connected to an input of the PLL circuit, the gate circuit passing the clock signal from the primary oscillation part to the PLL circuit when a high-state power-supply control signal is received at the first input, the PLL circuit producing a clock signal with a locked frequency when a high-state clock signal output by the gate circuit is received, and supplying the clock signal to the second driven circuit.

6. The apparatus according to claim 4, wherein the second driven circuit includes a buffer gate and an input of the second driven circuit, the input of the second driven circuit being connected to an output of the first driven circuit via a signal line, the buffer gate, when a data signal set in a high state by the first driven circuit is received from the signal line, converting the received data into a high-state data signal based on the secondary voltage.

7. The apparatus according to claim 6, wherein the buffer gate includes a resistor and a metal-oxide-semiconductor transistor connected in series between a secondary voltage line and a grounded base.

8. The apparatus according to claim 4, wherein the first driven circuit includes a gate circuit at an input of the first driven circuit, the input of the first driven circuit being connected to an output of the second driven circuit via a signal line, the gate circuit having a first input connected to the signal line and a second input connected to an output of the control signal generating part, the gate circuit enabling the first driven circuit to receive a data signal from the signal line when a high-state power-supply control signal output by the control signal generating part is received at the second input, and when the data signal that is set in a high state by the second driven circuit is received, the gate circuit converting the received data into a high-state data signal based on the primary voltage.

9. The apparatus according to claim 8, wherein the gate circuit includes a resistor and two metal-oxide-semiconductor transistors connected in series between a primary voltage line and a grounded base.

10. The apparatus according to claim 4, wherein the control signal generating part outputs a high-state power-supply control signal to the secondary power-supply circuit in response to a start command signal output by the first driven circuit, the high-state power-supply control signal causing the secondary power-supply circuit to start the supply of the secondary voltage to the second driven circuit.

11. The apparatus according to claim 4, wherein the control signal generating part outputs a low-state power-supply control signal to the secondary power-supply circuit in response to an end command signal output by the first driven circuit, the low-state power-supply control signal causing the secondary power-supply circuit to terminate the supply of the secondary voltage to the second driven circuit.

*12. A power control apparatus which drives a first driven circuit and a second driven circuit connected to the first driven circuit, comprising:*

*a primary power-supply circuit for producing a primary voltage from a source voltage of a battery, and supplying the primary voltage to drive the first driven circuit;*

*a secondary power supply circuit for producing a secondary voltage from the source voltage of the battery or from the primary voltage of the primary power-supply circuit, and supplying the secondary voltage to drive the second driven circuit; and*

*control means for outputting a power-supply control signal to the secondary power-supply circuit in response to a command signal from the first driven circuit, so that the supply of the secondary voltage to the second driven circuit by the secondary power-supply circuit is started or terminated by the power-supply control signal.*

*13. A power control apparatus which drives a first driven circuit and a second driven circuit connected to the first driven circuit, comprising:*

*a primary power-supply circuit for producing a primary voltage from a source voltage of a battery, and supplying the primary voltage to drive the first driven circuit;*

*a secondary power-supply circuit for producing a secondary voltage from the source voltage of the battery or from the primary voltage of the primary power-supply circuit, and supplying the secondary voltage to drive the second driven circuit; and*

*a control unit outputting a power-supply control signal to the secondary power-supply circuit in response to a command signal from the first driven circuit, so that the supply of the secondary voltage to the second driven circuit by the secondary power-supply circuit is started or terminated by the power control signal.*

*14. A power control apparatus which drives a first driven circuit and a second driven circuit connected to the first driven circuit, comprising:*

*a primary power-supply circuit connected to a battery, the primary power-supply circuit producing a primary voltage from a source voltage of the battery, and supplying the primary voltage to drive the first driven circuit;*

*a secondary power-supply circuit connected to the primary power-supply circuit, the secondary power-supply circuit producing a secondary voltage from the source voltage of the battery or from the primary voltage of the primary power-supply circuit, and supplying the secondary voltage to drive the second driven circuit;*

*a pirmary oscillation unit outputting a clock signal to the first driven circuit;*

*a primary reset generating unit outputting a primary reset signal to the first driven circuit when an oscillation of the primary oscillation unit is detected to be stable, the primary reset signal causing the first driven circuit to start operation in accordance with the clock signal output by the primary oscillation unit;*

*a control signal generating unit connected to both the first driven circuit and the secondary power-supply circuit, the control signal generating unit outputting a power-supply control signal to the secondary power-supply circuit in response to a command signal output by the first driven circuit, so that the supply of the secondary voltage to the second driven circuit by the secondary power-supply circuit is started or terminated by the power-supply control signal;*

*a secondary oscillation unit outputting a clock signal to the second driven circuit; and*

*a secondary reset generating unit outputting a secondary reset signal to the second driven circuit when an oscillation of the secondary oscillation unit is detected to be stable, the secondary reset signal causing the second driven circuit to start operation in accordance with the clock signal output by the secondary oscillation unit.*

*15. A power control apparatus, comprising:*

*a primary power-supply circuit for producing a primary voltage from a source voltage of a battery, and transmitting the primary voltage as a first driver signal;*

*a secondary power supply circuit for producing a secondary voltage from the source voltage of the battery or from the primary voltage of the primary power-supply circuit, and transmitting the secondary voltage as a second driver signal;*

*voltage detecting and resetting means for generating a driver reset signal when the primary power supply circuit produces the primary voltage; and*

*control means for outputting a power-supply control signal to the secondary power-supply circuit in response to a command signal, so that the second driver signal is started or terminated by the power-supply control signal.*

*16. A power control apparatus, comprising:*

*a primary power-supply circuit producing a primary voltage from a source voltage of a battery, and transmitting the primary voltage as a first driver signal;*

*a secondary power-supply circuit producing a secondary voltage from the source voltage of the battery or from the primary voltage of the primary power-supply circuit, and transmitting the secondary voltage as a second driver signal;*

*a voltage detection and resetting circuit for generating a driver reset signal when the primary power supply circuit produces the primary voltage; and*

*a control unit outputting a power-supply control signal to the secondary power-supply circuit in response to a command signal, so that the supply of the second driver signal is started or terminated by the power control signal.*

* * * * *